Jan. 2, 1951　　　　　H. B. McDONALD　　　　2,536,200
HYDRAULIC RATIO DRIVE
Filed Aug. 13, 1947　　　　　　　　　　　　　3 Sheets-Sheet 3
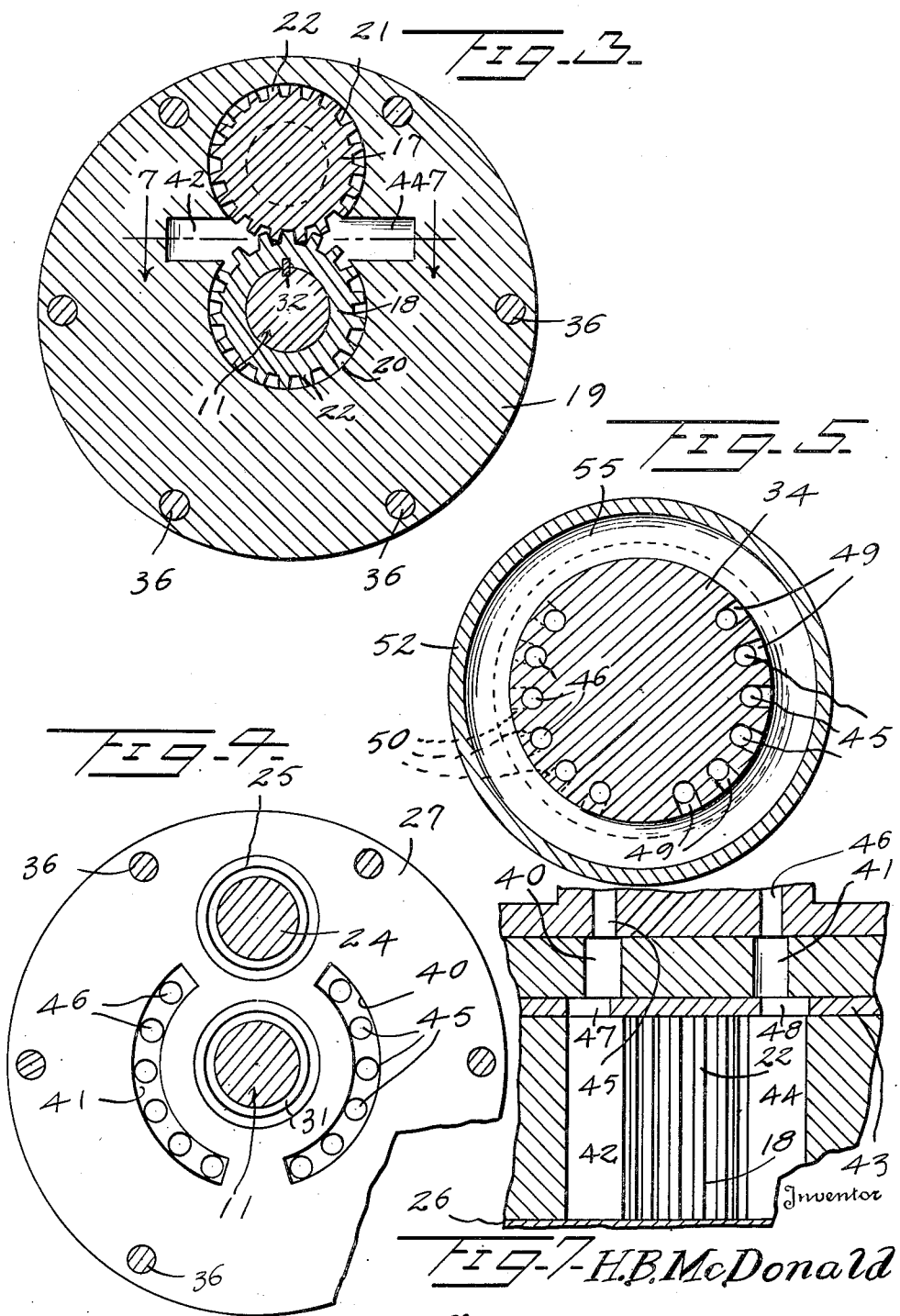

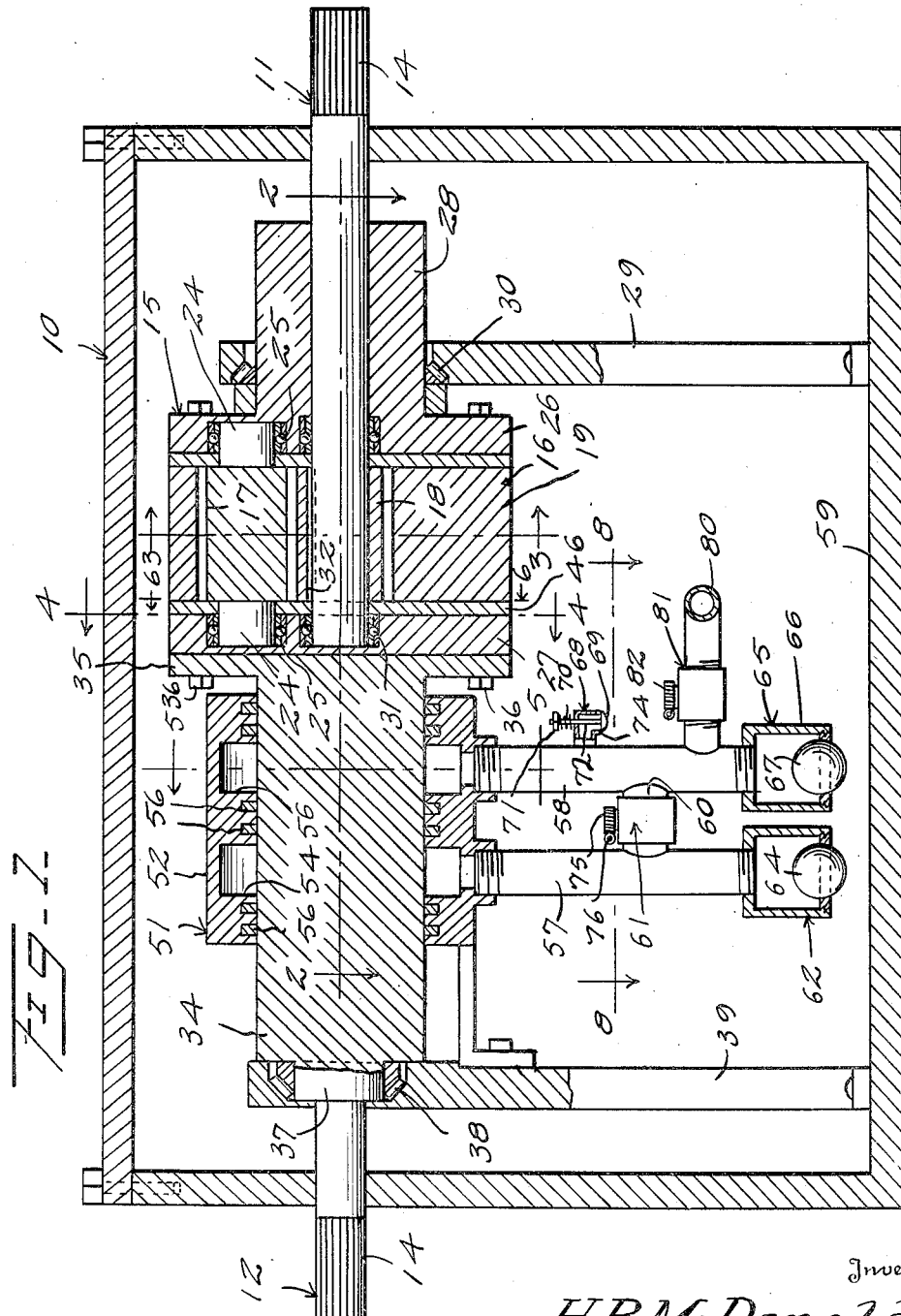

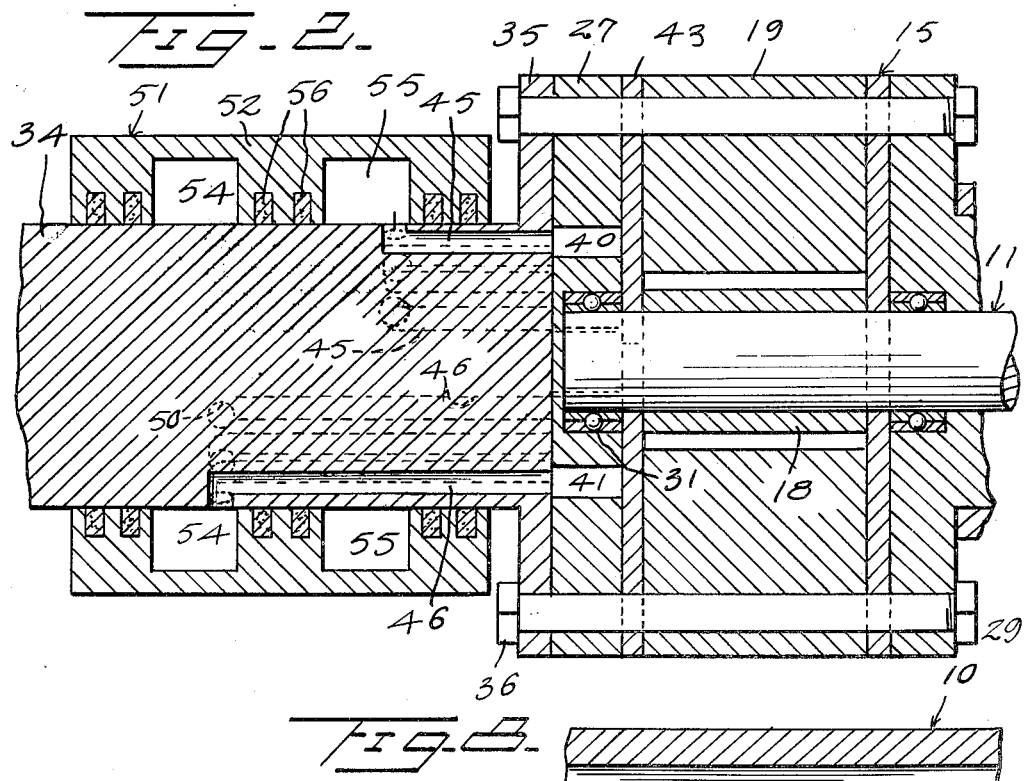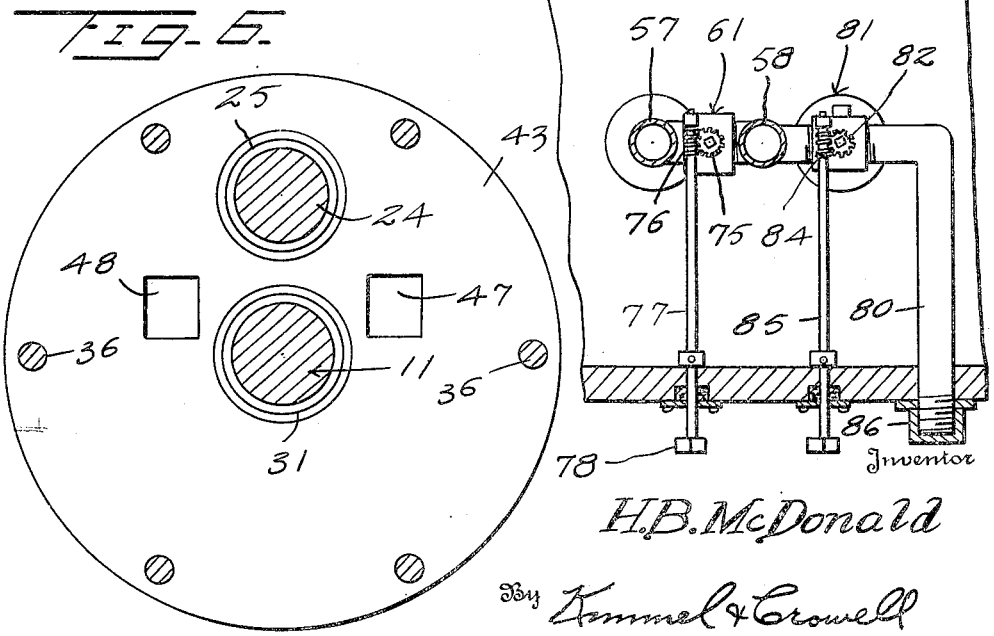

Patented Jan. 2, 1951

2,536,200

UNITED STATES PATENT OFFICE 2,536,200

HYDRAULIC RATIO DRIVE

Harrison B. McDonald, Abilene, Tex.

Application August 13, 1947, Serial No. 768,303

3 Claims. (Cl. 103—126)

This invention relates to an improved hydraulic transmission and more particularly to a hydraulic transmission having means for varying the speed ratio of the driving and driven shafts.

It is an object of this invention to provide an improved hydraulic transmission of the kind to be more particularly described hereinafter having a hydraulic pump driven by the drive shaft; and a driven shaft fixed on the pump casing, and having a hydraulic circuit between the inlet and discharge ports of the pump with a valve for varying the flow throughout the circuit for varying the speed relation of the driving and driven shafts.

Another object of this invention is to provide a hydraulic transmission of this kind having an external connection whereby said transmission may be used as a pump for supplying pressure to an external fluid pressure operated device.

A further object of this invention is to provide a hydraulic transmission of this kind having a housing which constitutes a reservoir for the hydraulic fluid and in which the driving and driven shafts are connected together by a fluid clutch formed by a hydraulic pump carried partly by the driven shaft and partly by the driving shaft. A valve is disposed between the inlet and outlet ports of the pump and the position of the valve determines the flow of fluid from the discharge port to the inlet port, the solidity of the connection being determined and controlled by the position of the valve and the flow of hydraulic fluid.

A still further object of this invention is to provide a hydraulic transmission of this kind having a fluid connection between the driving and driven shafts so constructed and arranged whereby the driving connection will be dependent upon and inversely proportional to the flow of fluid. When the valve is opened to permit the free flow of fluid through the pump and its associated conduits, both shafts will be independent and as the flow is restricted the rotation of the pump gears will be restricted effecting rotation of the driven shaft by the drive shaft.

Yet another object of this invention is to provide a pressure relief valve in a hydraulic transmission of this kind which may be set to open at a predetermined pressure to prevent the rupture of any of the parts of the transmission due to an excessive pressure in the system, caused by stopping of the driven shaft.

With the above and other objects in view, my invention consists in the arrangement, combination and details of construction disclosed in the drawings and specification, and then more particularly pointed out in the appended claims.

In the drawings,

Figure 1 is a longitudinal section of a hydraulic transmission constructed according to an embodiment of my invention, Figure 2 is a horizontal section taken on the line 2—2 of Figure 1, Figure 3 is a vertical section taken on the line 3—3 of Figure 1, Figure 4 is a vertical section partly broken away taken on the line 4—4 of Figure 1, Figure 5 is a vertical section taken on the line 5—5 of Figure 1, Figure 6 is a section taken on the line 6—6 of Figure 1, Figure 7 is a fragmentary detail horizontal section taken on the line 7—7 of Figure 3, and Figure 8 is a fragmentary horizontal section taken on the line 8—8 of Figure 1.

Referring to the drawings, the numeral 10 designates generally the housing for a hydraulic transmission in which the connection between the driving and the driven shaft is effected by the rate of flow of hydraulic fluid between the connecting members carried by the shafts.

A driving shaft as 11 is rotatably supported at one end of the housing 10 and the driven shaft 12 is rotatably supported in the housing 10 at the other end of the housing from the shaft 11, being substantially co-axial with the driving shaft 11.

The shafts 11 and 12 are provided with splines 14 on their outer end which extend from the housing 11 for attachment of the shafts 11 and 12 to the motive power shafts and to the shaft of the driven element.

The housing 10 is hollow and provides a reservoir for the fluid in the connecting means between the driving and driven shafts. A fluid connection which includes a hydraulic pump 15 is provided as the connecting means between the driving and the driven shafts.

The fluid pump 15 as shown in the drawings is of the gear type and is provided with a housing 16 within which the gears 17 and 18 are rotatably journalled. The housing 16 is formed of a central disc member 19 provided with annular interengaging openings 20 and 21 within which the gears 17 and 18 are engaged.

The teeth 22 of the gears 17 and 18 are spaced from the walls of the annular openings 20 and 21 sufficient only for the rotation of the gears in these openings. The gear 17 is elongated providing substantially a cylindrical member having bearing bosses 24 on each end thereof. The bosses 24 are journalled in bearings 25 carried in or fixed in their outer plates 26 and 27 of the pump 15.

The end plate 26 of the pump 15 is provided with an outwardly extending concentric boss or bearing 28 which is rotatably supported in a standard 29 fixed in the housing 10. Bearings 30 are provided between the standard 29 and the bearing box 28 for free rotation of the member 28 in the standard 29.

The gear 18 is of a suitable configuration for closely engaging with the teeth of the gear 17. The driving shaft 11 extends through the bearing member 28 and through the central member 19 of the pump 15 and is journalled at its inner end in a bearing 31 carried by the end plate 27.

The gear 18 is fixed on the driving shaft 11 by a key 32 or other suitable fastening means whereby the gear 18 is rotated directly by the rotation of the driving shaft 11. The driven shaft 12 is fixed to the pump 15 by direct connection with the end plate 27 thereof. A connecting member 34 is fixed to or formed on the driven shaft 12 within the housing 10 and the member 34 is formed with an annular flange 35 at its inner end which is adapted to be secured to the end plate 27 by bolts 36 or other suitable fastening devices.

The connecting member 34 is provided at its outermost end with a reduced diameter bearing surface 37 engaging in a bearing 38 supported on a standard 39 fixed in the housing 10.

Fluid conducting means through which the hydraulic fluid is adapted to flow upon operation of the gears of the pump is carried by and formed in the connecting member 34. The end plate 27 of the pump 15 is provided with a pair of spaced apart openings 40 and 41 through which the fluid may flow in its passage through the pump 15 and the gears 17 and 18.

The openings 40 and 41 of the end plate 27 communicate directly on one side with openings 42 and 44 respectively which are formed in the central member 19 of the pump 15 adjacent the gears 17 and 18 at the point of engagement therebetween.

As shown in the drawings, the openings 40 and 42 provide an inlet port for the pump 15 and the openings 41 and 44 provide an outlet port. The connecting member 34 which is carried by the driven shaft 12 is provided with a series of longitudinally extending drilled passages or openings 45 which communicate at one end with the arcuate slot or opening 40 of the end plate 27.

The passages 45 are circumferentially spaced apart about the periphery of the member 34 on one side thereof. Drilled passages or openings 46 are provided in the member 34 extending longitudinally thereof for communication with the outlet port or opening 41 of the end plate 27.

The openings or passages 46 are similar to the openings 45 being circumferentially spaced apart on one side of the member 34. A sealing member or washer 43 is carried by the pump 15 between the end plate 27 and the central portion of the housing 19. The sealing member 43 is formed with openings 47 and 48 therethrough between the openings 41 and 44 and between the openings 42 and 40 of the adjacent pump parts.

Radially extending openings 49 are formed in the member 34 from the ends of the drilled passages 45 and the openings 49 provide passages about the periphery of the member 34 through which the hydraulic fluid is adapted to pass for its passage into the openings 45 and into the pump 15. Drilled passages 50 are formed in the member 34 radially thereof for communication with the outer end of the passages 46 providing a fluid outlet from the pump through the passages 46 and through the member 34.

The openings 49 and 50 are spaced apart longitudinally relative to the axis of the member 34. A bearing member 51 is provided for the member 34 through which the fluid may be admitted to the passages 45 and 46 to the pump 15. The bearing member 51 is formed of a tubular body 52 having a pair of radial recesses or grooves 54 and 55 formed on the inner surface thereof. The recesses 54 and 55 are longitudinally spaced apart along the length of the bearing 51.

Sealing rings as 56 are carried by the bearing member 51 on the inner surface thereof adjacent the ports or recesses 54 and 55 for engagement with the bearing or member 34. The recess 54 is disposed about the bearing 34 for communication with the openings 49 in the member 34. The openings 50 which open out of the bearing 34 communicate with the passage or recess 54 of the bearing member 51. A pipe or tubular connection 57 extends downwardly from the bearing 51 in communication with the recess 54 therein. A similar pipe or tube 58 extends downwardly from the bearing 51 and is in communication with the recess 55 therein.

The pipes or tubes 57 and 58 extend downwardly and terminate a short distance above the bottom 59 of the housing 10. The tubes 57 and 58 provide the inlet and discharge openings of the pump 15 in connection with the reservoir or fluid carried within the housing 10.

A connecting tube or pipe 60 is fixed between the tubes 57 and 58 below the bearing 51 within the housing 10. A valve 61 is fixed along the length of the connecting tube 60 for controlling the flow of liquid therebetween.

A check valve 62 which includes a ball 64 is carried by the lower end of the pipe 57 to permit the flow of liquid from the reservoir up into pump 15. A similar check valve 65 having a housing 66 threadably mounted on the lower end of the tube 58 and having a ball check 67 permits the flow of fluid upwardly into the tube 58 and into the pump 15 upon reverse rotation of the pump.

A pressure relief valve 68 is carried by the pipe 58 for use in relieving the pressure when the pipe 58 is used as a discharge or outlet pipe of the pump 15.

The pressure relief valve 68 is formed with a valve 69 and a valve spring 70 so constructed and arranged that the tension of the valve spring 70 may be adjusted by a nut 71 threadably engaged on the upper end of the valve stem 72. The spring 70 engages between the nut 71 and the upper end of the housing of the valve 68 while the valve 69 closes a valve seat 74 formed by the lower end of the valve 68.

For actuating the valve 61 between the tubes or pipes 57 and 58 a gear 75 is fixed on the upper end of the valve stem thereof and a screw 76 is supported for engagement with the gear 75. The screw 76 is fixed on the inner end of a shaft 77 which extends through one side wall of the housing 10.

A handle 78 is fixed on the outer end of the shaft 77 so that rotation of the shaft will effect rotation of the gear 75 and the resultant closing or opening of the valve 61.

In the use and operation of this hydraulic transmission described above, the driving shaft 11 is connected to a suitable source of power supply as an electric motor or the like. With the valve 61 in the full open position for permitting the free flow of the liquid caused to flow by the gears 17 and 18 of the pump 15 as the shaft 11 is rotated, this rotation will not be communicated to the driven shaft 12 as the engagement of the gears 17 and 18 will cause the fluid to flow through the tube 57, the recess 54, the openings 49, the passage 45, the openings 47 and 40, and into the pump 15.

The fluid entering the pump 15 is free to leave the pump through the outlet openings 41 and 48 and through the passages 46 and 50 into the recess 55 through the pipe 58 and valve 61 where the cycle is repeated.

If there is insufficient fluid within the circuit of the pump, the low pressure caused by the engagement of the rotating gears 17 and 18 will draw whatever fluid is further necessary up through the check valve 64. Any excess fluid or pressure developed by the rotation of the pump 15 will be discharged through the pressure relief valve 68. It will be seen then that with any friction or force restraining the movement of the driven shaft 12 when the valve 61 is open the shaft 11 will rotate freely and the gears 17 and 18 will rotate freely within the pump 15 so that no torsional force will be transmitted from the driving shaft 11 to the driven shaft 12. As the valve 61 is closed the flow of fluid through the pump and connecting passages will be restricted or completely shut off so that the fluid will not pass freely through the passages thereby restraining the free movement of the gear 17 in the pump.

Since the gear 17 will be locked against rotation as the driving shaft 11 is rotated, the torsional force exerted on this shaft will be transmitted through the gears 18 and 17 to exert a torsional force on the housing of the pump 15.

As the pump is directly connected to the driven shaft 12 this force of the driving shaft will be transmitted directly to the driven shaft for rotation therewith.

In the connected position of the transmission with the valve 61 closed a large pressure will be set up in the discharge pipes and passages of the pump and this pressure may be regulated by the pressure relief valve 68 so that the pressure may be relieved prior to the breaking of any of the connecting parts between the shafts 11 and 12.

With the valve 61 partially open, a partially clutched condition will prevail between the shafts 11 and 12. In this manner the transmission including the pump 15 and valve 61 will form a clutch which will maintain the shafts 11 and 12 in engagement for a definite force or restraining force on the shaft 12.

With a transmission of this kind, no other clutch members or devices need be provided and the valve 61 may be controlled or operated by any suitable means by the operator of the vehicle equipped with such a transmission so that a full range or clutching engagement between the shafts 11 and 12 may be maintained.

A transmission of this kind may also be used with tractors and other equipment in which it is desired to utilize the actual pump effect of the gears 17 and 18. As many accessory devices are carried by tractors and the like to be operated by a hydraulic pump, I have provided an outlet pipe or tubular connection 80 which is connected to the discharge pipe 58 of the transmission 10.

A valve 81 is provided along the length of the pipe 80 having a gear 82 connected to the valve stem thereof and a screw 84 on a control shaft 85 which extends through one wall of the housing of the transmission 10.

The pipe 80 in one position discharges through the wall of the transmission 10 and may be provided with a cap 86 for closing this pipe when it is not in use. For using the transmission 10 as a pump, the valve 81 is opened so that rotation of the shaft 11 will effect the rotation of the gears 17 and 18 for pumping the fluid through the discharge pipe 58 and out through the accessory drive connection 80. While no return pipe is shown from the accessory fluid drives since most of the accessory drives are pistons which require fluid pressure in only one direction, no return fluid connection will be required in many instances and where it is required a suitable return connection may be made to the reservoir or housing and if desired may be connected to the pipe 57 with a suitable valve connection. In the other or closed position of valve 81, the fluid is discharged through the outlet 57 into the reservoir.

I do not mean to confine myself to the exact details of construction herein disclosed, but claim all variations falling within the purview of the appended claims.

Having thus described my invention, what I claim is:

1. An improved hydraulic transmission comprising a reservoir containing hydraulic fluid, a pump housing rotatably mounted in said reservoir, a connecting member secured to said housing for rotation therewith, a driven shaft secured to said connecting member, a drive shaft extending into said housing, a gear on said shaft, a second gear in said housing in mesh with said first mentioned gear, a hydraulic fluid inlet to said housing adjacent the point of engagement of said gears, a fluid outlet on the opposite side of said gears relative to said housing, a bearing member having a pair of annular channels therethrough surrounding said connecting member, means communicating said inlet with one of said channels, means communicating said outlet with the other of said channels, tubes extending below the level of the fluid in said reservoir communicating with each of said channels, inwardly opening check valves in the lower ends of each of said tubes below the level of said fluid, a connection between said tubes and a manually controlled valve in said connection.

2. An improved hydraulic transmission comprising a reservoir containing hydraulic fluid, a pump housing rotatably mounted in said reservoir, a connecting member secured to said housing for rotation therewith, a driven shaft secured to said connecting member, a drive shaft extending into said housing, a gear on said shaft, a second gear in said housing in mesh with said first mentioned gear, a hydraulic fluid inlet to said housing adjacent the point on engagement of said gears, a fluid outlet on the opposite side of said gears relative to said housing, a bearing member having a pair of annular channels therethrough surrounding said connecting member, means communicating said inlet with one of said channels, means communicating said outlet with the other of said channels, tubes extending below the level of the fluid in said reservoir communicating with each of said channels, inwardly opening check valves in the lower ends of each of said tubes below the level of said fluid, a connection between said tubes, a manually controlled valve in said connection, and a pressure relief valve in one of said tubes.

3. An improved hydraulic transmission comprising a reservoir containing hydraulic fluid, a pump housing rotatably mounted in said reservoir, a connecting member secured to said housing for rotation therewith, a driven shaft secured to said connecting member, a drive shaft extending into said housing, a gear on said shaft, a second gear in said housing in mesh with said first mentioned gear, a hydraulic fluid inlet to said housing adjacent the point on engagement of said gears, a fluid outlet on the opposite side of said gears relative to said housing, a bearing member having a pair of annular channels therethrough surrounding said connecting member, means communicating said inlet with one of said channels, means communicating said outlet with the other of said channels, tubes extending below the level of the fluid in said reservoir communicating with each of said channels, inwardly opening check valves in the lower ends of each of said tubes below the level of said fluid, a connection between said tubes, a manually controlled valve in said connection, a pressure relief valve in one of said tubes, an accessory drive connection pipe communicating with one of said tubes, and a valve in said pipe.

HARRISON B. McDONALD.

REFERENCES CITED

The following references are of record in the file of this patent:

UNITED STATES PATENTS

| Number | Name | Date |
|---|---|---|
| 1,883,685 | Gasterstadt | Oct. 15, 1932 |
| 1,896,577 | Foster | Feb. 7, 1933 |
| 1,935,400 | Junkers | Nov. 14, 1933 |
| 2,028,982 | Lambert | Jan. 28, 1936 |
| 2,311,237 | Loveday | Feb. 16, 1943 |
| 2,390,008 | Doran | Apr. 23, 1946 |